US006368381B1

(12) United States Patent
King et al.

(10) Patent No.: US 6,368,381 B1
(45) Date of Patent: *Apr. 9, 2002

(54) AUTOCLAVE USING AGITATOR AND SPARGE TUBE TO PROVIDE HIGH OXYGEN TRANSFER RATE TO METAL-CONTAINING SOLUTIONS

(75) Inventors: James A. King, Tofino; Jinxing Ji, Burnaby, both of (CA)

(73) Assignee: Placer Dome Technical Services, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/561,256

(22) Filed: Apr. 27, 2000

Related U.S. Application Data

(63) Continuation-in-part of application No. 09/038,448, filed on Mar. 11, 1998, now Pat. No. 6,183,706.
(60) Provisional application No. 60/142,836, filed on Jul. 7, 1999.

(51) Int. Cl.$^7$ ............................................. C22B 3/02
(52) U.S. Cl. ............................................. 75/710
(58) Field of Search ................................. 75/710

(56) References Cited

U.S. PATENT DOCUMENTS

| 2,928,661 A | 3/1960 | MacLaren |
| 3,414,245 A | 12/1968 | Frazer |
| 3,954,450 A | 5/1976 | Kuhn et al. ............... 423/95 |
| 3,961,908 A | 6/1976 | Touro ..................... 23/290 |
| 4,022,866 A | 5/1977 | Kuhn et al. ............... 423/32 |
| 4,070,182 A | 1/1978 | Genik-Sas-Berezowsky et al. ......... 75/103 |
| 4,153,522 A | 5/1979 | Arbiter et al. ............. 423/33 |
| 4,265,739 A | 5/1981 | Dalton ................... 209/169 |
| 4,269,622 A | 5/1981 | Kerley, Jr. ............... 75/103 |
| 4,331,635 A | 5/1982 | Arbiter et al. ............. 423/33 |
| 4,369,061 A | 1/1983 | Kerley, Jr. ............... 75/103 |

(List continued on next page.)

FOREIGN PATENT DOCUMENTS

WO    WO 91/11539    8/1991

OTHER PUBLICATIONS

EKATO Pamphlet; "Mixing Update for Gassing Applications: EAKTO's Self-Aspirating Impeller System"; 2 pages. 1999.*

Atluri; "Recovery of Gold and Silver From Ammoniacal Thiosulfate Solutions Containing Copper by Resin Ion Exchange Method"; Thesis Submitted to the Faculty of the Department of Materials Science and Engineering (University of Arizona); 1987. No Month.

Agadzhanyan et al.; "Kinetics of Ion Exchange in Selective Systems, II. Kinetics of the Exchange of Differently Charged Ions in a Macroporous Ion Exchanger"; *Russian Journal of Physical Chemistry;* vol. 61; 1987; pp. 994–997. No Month.

Marcus; "The Anion Exchange of Metal Complexes—The Silver—Thiosulphate System"; *ACTA Chemica Scandinavica II;* 1957; pp. 619–627. No Month.

*Primary Examiner*—Roy King
*Assistant Examiner*—Tima McGuthry-Banks
(74) *Attorney, Agent, or Firm*—Sheridan Ross P.C.

(57) ABSTRACT

The autoclave of the present invention includes an impeller having a conduit to recirculate or introduce a molecular oxygen-containing gas into the slurry. The outlets for the gas can be located in the blades of the impeller for thorough dispersion of the gas bubbles in the slurry. A sparge tube for introducing an additional molecular oxygen-containing gas into the slurry can be used in conjunction with the impeller to provide a high molecular oxygen transfer rate to the slurry.

45 Claims, 4 Drawing Sheets

U.S. PATENT DOCUMENTS

| | | | |
|---|---|---|---|
| 4,384,889 A | 5/1983 | Wiewiorowdski et al. | 75/101 |
| 4,552,589 A | 11/1985 | Mason et al. | 75/105 |
| 4,571,264 A | 2/1986 | Weir et al. | 75/101 |
| 4,578,163 A | 3/1986 | Kunter et al. | 204/110 |
| 4,605,439 A | 8/1986 | Weir | 75/118 |
| 4,606,763 A | 8/1986 | Weir | 75/101 |
| 4,610,724 A | 9/1986 | Weir et al. | 75/118 |
| 4,654,078 A | 3/1987 | Perez et al. | 75/118 |
| 4,723,998 A | 2/1988 | O'Neil | 75/101 |
| 4,738,718 A | 4/1988 | Bakshani et al. | 75/105 |
| 4,765,827 A | 8/1988 | Clough et al. | 75/2 |
| 4,801,329 A | 1/1989 | Clough et al. | 75/97 |
| 4,816,235 A | 3/1989 | Pesic | 523/32 |
| 4,902,345 A | 2/1990 | Ball et al. | 75/118 |
| 4,923,510 A | 5/1990 | Ramadorai et al. | 423/29 |
| 4,925,485 A | 5/1990 | Schultze | 423/22 |
| 4,968,008 A | 11/1990 | Emmett, Jr. et al. | 266/168 |
| 4,974,816 A | 12/1990 | Emmett, Jr. et al. | 423/DIG. 17 |
| 4,979,987 A | 12/1990 | Mason et al. | 75/744 |
| 5,071,477 A | 12/1991 | Thomas et al. | 75/744 |
| 5,127,942 A | 7/1992 | Brierley et al. | 75/744 |
| 5,215,575 A | 6/1993 | Butler | 75/743 |
| 5,223,024 A | 6/1993 | Jones | 75/743 |
| 5,236,492 A | 8/1993 | Shaw et al. | 75/744 |
| 5,354,359 A | 10/1994 | Wan et al. | 75/744 |
| 5,489,326 A | 2/1996 | Thomas et al. | 75/744 |
| 5,536,297 A | 7/1996 | Marchbank et al. | 75/736 |
| 5,698,170 A | 12/1997 | King | 423/24 |
| 6,183,706 B1 * | 2/2001 | King | 423/23 |

* cited by examiner

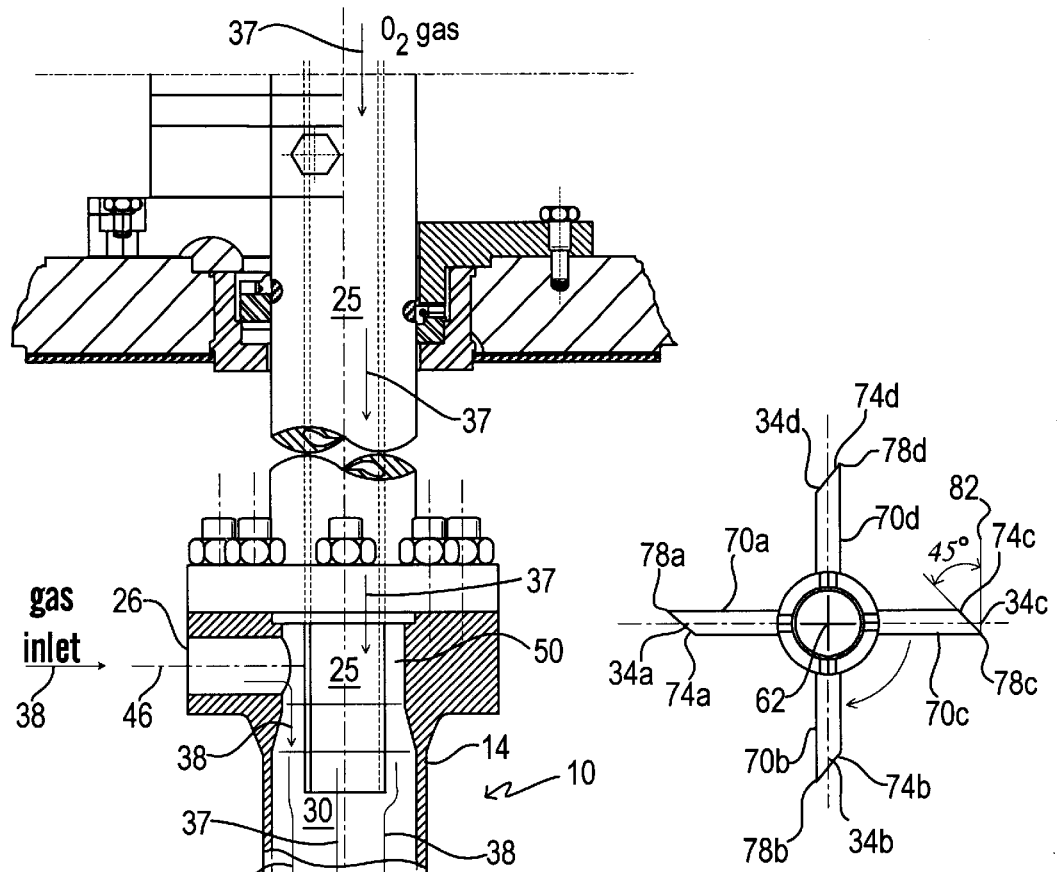
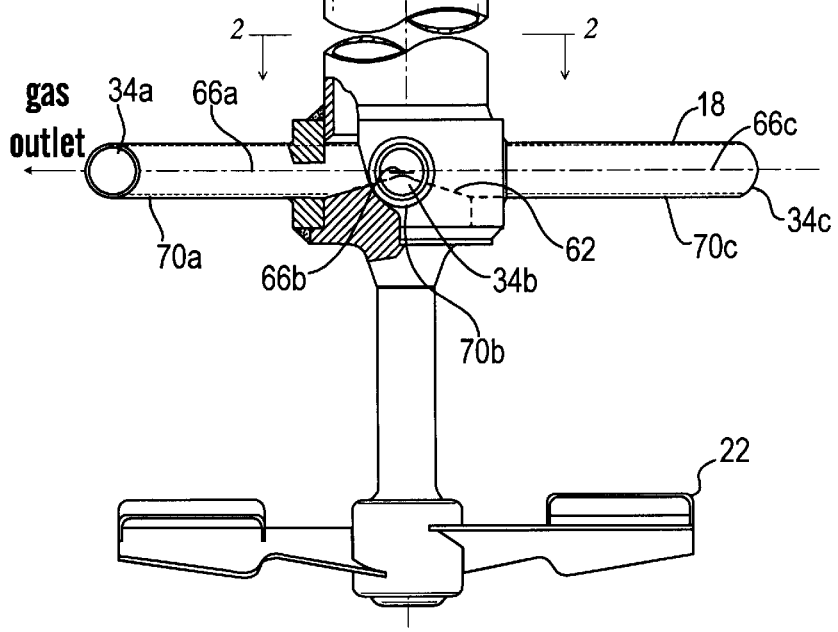
FIG. 2
FIG. 1

AUTOCLAVE USING AGITATOR AND SPARGE TUBE TO PROVIDE HIGH OXYGEN TRANSFER RATE TO METAL-CONTAINING SOLUTIONS

CROSS REFERENCE TO RELATED APPLICATIONS

The present application claims the benefits under 35 U.S.C.§119(e) of U.S. Provisional Application Ser. No. 60/142,836, filed Jul. 7, 1999, and is a continuation-in-part of U.S. patent application Ser. No. 09/038,448, filed Mar. 11, 1998, now U.S. Pat. No. 6,183,706 B1 which are both incorporated herein by reference in their entireties.

FIELD OF THE INVENTION

The present invention is generally directed to autoclaves and specifically to autoclaves having high rates of oxygen transfer to metal-containing solutions.

BACKGROUND OF THE INVENTION

To oxidize sulfide sulfur and thereby permit solubilization and/or liberation of metals compounded with the sulfide sulfur, base metal ores and concentrates, and refractory gold ores and concentrates are commonly treated by pressure oxidation. Pressure oxidation is typically performed by passing a feed slurry of a metal-containing material through a sealed autoclave (operating at superatmospheric pressure) having multiple compartments. To provide for oxidation of the sulfide sulfur in the slurry, oxygen is typically fed continuously to the autoclave by means of a sparge tube located below the impeller. Commonly a large portion of the oxygen reacts with the sulfide sulfur, but there is a smaller significant portion that is vented from the autoclave and may be considered not effectively utilized.

In designing an autoclave, there are a number of considerations. By way of example, the autoclave should permit reaction of as much of the oxygen as possible with sulfide sulfur. If the oxygen is inefficiently reacted with the sulfide sulfur, the autoclave can have higher oxygen plant capital and operating costs. The autoclave should provide as short a residence time as possible for a given volume of slurry while realizing a high rate of recovery for the metal. Finally, the autoclave should vent inert gases that build up in the autoclave above the slurry to prevent rupturing of the autoclave from high pressure gas. Some oxygen gas is inevitably vented along with these inert gases. Other processes, which rely on efficient and effective gas/liquid transfer of oxygen and which are commonly carried out in autoclaves, include catalytic chemistry reactions, such as the conversion of ferrous to ferric ions, reoxidation of NO by oxygen, and cuprous amine conversion to cupric amine.

SUMMARY OF THE INVENTION

These and other design objectives are satisfied by the autoclave designs of the present invention.

In one embodiment, the autoclave includes a vessel for containing a feed slurry material, such as a metal sulfide-containing slurry, or a liquid comprising dissolved chemical compounds and one or more agitators with each agitator having one or more impellers attached to a rotatable shaft for agitating the feed slurry material. The shaft has a passage for a molecular oxygen-containing gas and an outlet in communication with the passage for dispersing the oxygen-containing gas in the slurry. In one configuration, the passage passes along the length of the rotatable shaft, and the outlet is located at or close to the tip of the impeller.

The autoclave can realize relatively high (molecular) oxygen transfer rates to the feed slurry material relative to conventional autoclaves through better oxygen gas dispersion in the feed slurry material. Commonly, the autoclave can yield an oxygen transfer rate of at least about 2 kg moles oxygen/cubic meter of slurry/hour. At such high oxygen transfer rates, a high rate of metal recovery can be realized in a relatively short residence time, and therefore lower capital and operating costs for the autoclave equipment can be realized relative to conventional pressure oxidation processes.

The autoclave is able to accomplish such relatively high oxygen transfer rates without the use of a sparge tube, though the sparge tube when used jointly with the agitator can produce even higher oxygen transfer rates.

To permit consumption of as much molecular oxygen as possible, the rotatable shaft of one agitator configuration has an inlet for the molecular oxygen containing gas located at an upper end of the shaft that is above the slurry surface yet is contained within the vessel. The inlet will provide a suction, drawing the atmosphere in the autoclave into the passage. After passing through the passage, the gas is dispersed into the feed slurry material. In this manner, the molecular oxygen is continuously recycled during pressure oxidation to provide a high rate of molecular oxygen utilization. By efficiently reacting the molecular oxygen, the autoclave can have lower (molecular) oxygen plant capital and operating costs than conventional autoclaves.

In another configuration, new molecular oxygen is supplied to the autoclave either directly through the rotatable shaft or through a separate conduit such as one having an outlet in close proximity to the agitator gas inlet or above the feed slurry material. In the latter case, the shaft includes the inlet at the upper end of the shaft to permit oxygen escaping from the agitated feed slurry material into the autoclave atmosphere and/or supplied directly to the atmosphere from an external source to be drawn into the shaft and thereby entrained in the agitated feed slurry material.

The agitator of the present invention can provide improved reaction rates in the upstream compartments of the autoclave. In conventional autoclaves, the initial compartments frequently operate at a temperature below the desired operating range (which is from about 180° C. to about 220° C.) because the exothermic conversion of sulfides to sulfates in the initial compartments is insufficiently complete to raise the temperature to the desired operating range. To raise the temperature to within this range, it is common to add steam (from a source external to the autoclave) to the initial compartments to raise the temperature of the slurry in the compartment and thereby increase the rate of conversion of sulfides to sulfates. Steam can be costly to add to the system. In contrast, in the autoclave of the present invention the agitator draws steam in the autoclave atmosphere through the shaft and into the slurry in the initial compartments, thereby providing a higher temperature in the slurry in these compartments and a concomitant higher reaction rate. In other words, the agitator increases the heat transfer from the discharge end of the autoclave (i.e., the downstream compartments) to the input end of the autoclave (i.e., the upstream compartments). Accordingly, the autoclave of the present invention can be less expensive to operate than conventional autoclaves that inject steam into the initial compartments.

In another embodiment, the autoclave includes a discharge control means for controllably removing the gas atmosphere from the sealed autoclave to prevent rupture of the autoclave from high pressure gases. The system typically includes:

(a) analyzing means (e.g., a gas analyzer) for analyzing a selected component (e.g., carbon dioxide and/or molecular oxygen) in the gas atmosphere inside the autoclave;

(b) an outlet for removing gas in the gas atmosphere from the autoclave interior;

(c) a controller (e.g., a computer) for receiving a signal from the gas analyzer and generating a control signal in response thereto; and (c) a control means (e.g., a valve) for controlling the amount of gas removed in response to the control signal received from the controller. The control means vents the gas atmosphere when the amount of the component exceeds or falls below a threshold amount. In this manner, the autoclave can vent oxygen gas and other gases that build up in the autoclave above the slurry while maintaining the molecular oxygen gas in the autoclave as long as possible for consumption in the oxidation of sulfide sulfur.

In one embodiment, pressure oxidation using the autoclave is performed using the following steps:

(a) agitating a feed slurry material in the autoclave using an impeller, and (b) during the agitating step (a), passing a molecular oxygen-containing gas through a rotatable shaft engaging the impeller and dispersing the gas radially outward from the shaft into the feed slurry material. In one autoclave configuration, the gas is passed through a blade of the impeller outwardly into the slurry.

In another embodiment of the invention, the agitator is used in conjunction with a sparge tube to provide a further increase in the (molecular) oxygen content of the feed slurry material. The sparge tube is preferably located in the vicinity of a lower impeller and more preferably is located beneath the lower impeller such that bubbles of the molecular oxygen-containing gas released by the sparge tube are dispersed in the vessel by the lower impeller. Alternatively, the sparge tube could be located directly below a gassing impeller which expels recycled gas into the slurry. In this configuration, the agitator may or may not include a second, mixing (e.g., nongassing, high shear, etc.) impeller.

The sparge tube can introduce fresh molecular oxygen (directly) into the slurry from a source external to the autoclave and/or recycle oxygen in the atmosphere of the autoclave into the slurry. Recycle using the sparge tube can be performed using an external gas recirculating pump or blower. In a particularly preferred configuration, the agitator (e.g., upper impeller) recycles molecular oxygen from inside of the autoclave into the slurry while the sparge tube introduces fresh molecular oxygen into the slurry (e.g., below the lower impeller) from a source external to the autoclave. In this configuration, the sparge gas is substantially free of recycled molecular oxygen and the sparge gas is introduced into the slurry at a different point than the recycled gas passing through the agitator. Typically, at least about 75% and more typically at least about 90% of the oxygen in the sparge gas is from the external source (e.g., has not yet been circulated through the slurry). Typically at least about 75% and more typically at least about 90% of the molecular oxygen in the recycled gas is from the autoclave atmosphere above the slurry (e.g., has been circulated through the slurry at least once). In this configuration, the two gas streams remain independent of one another until they are introduced into the slurry. In another configuration, the sparge tube recycles molecular oxygen from inside of the autoclave into the slurry while the agitator introduces fresh molecular oxygen into the slurry from a source external to the autoclave. As will be appreciated, the content or concentration of molecular oxygen (and nitrogen) in the fresh gas stream from a source external to the autoclave will typically be greater than a molecular oxygen (or nitrogen) content or concentration in the autoclave atmosphere (and therefore in the recycled gas stream). The concentration of water vapor and/or carbon dioxide in the fresh gas stream is typically less than the concentrations of the components in the recycled gas stream. As will be further appreciated, molecular oxygen is consumed in the autoclave during sulfide oxidation. Typically, the concentration of molecular oxygen in the gas stream from a source external to the autoclave is at least about 17.5% by volume and more typically at least about 85% by volume. The autoclave atmosphere typically contains no more than 50% by volume molecular oxygen and more typically contains from about 5 to about 20% by volume molecular oxygen. Typically, the concentrations of water vapor and carbon dioxide in the recycled gas each range from about 1 to about 90% by volume. In contrast, the fresh gas stream typically is substantially free of water vapor and carbon dioxide and more typically contains no more than about 0.5% by volume of either component.

BRIEF DESCRIPTION OF THE DRAWINGS

FIG. 1 depicts a side view of the interconnected impeller and the rotatable shaft of the agitation assembly, with certain parts of the agitation assembly being shown in cross-section;

FIG. 2 is a cross-sectional view taken along line 2—2 of FIG. 1;

DETAILED DESCRIPTION

Figure 3:
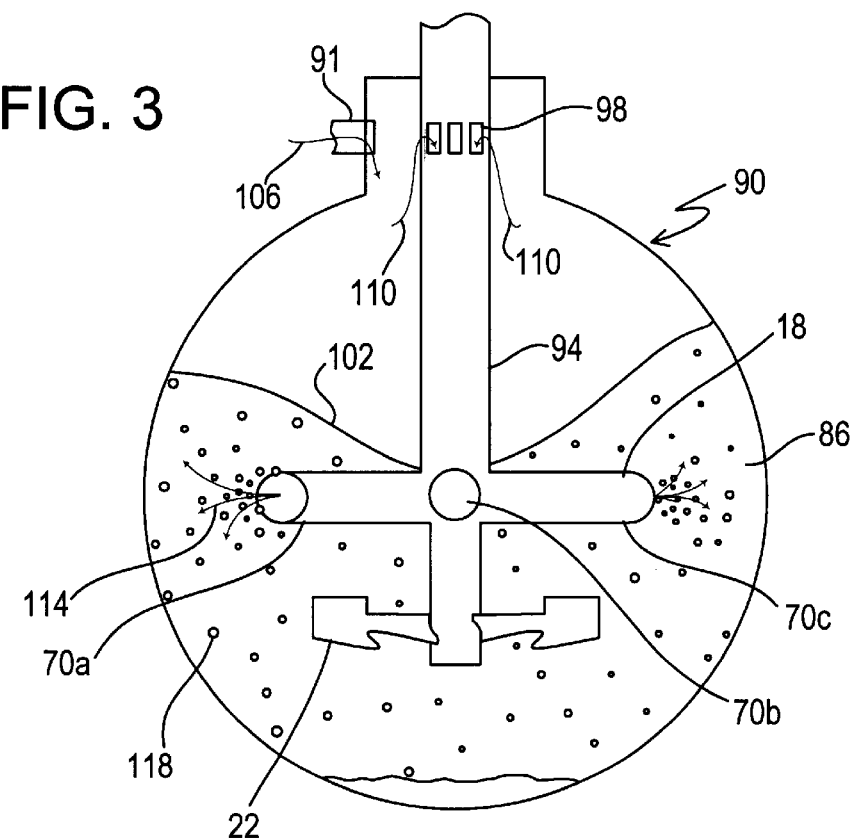
FIG. 3 depicts the agitation assembly operating in an autoclave.

The present invention is directed to a sealed autoclave particularly useful for pressure oxidation of slurried ores and concentrates. Although the autoclave is discussed with reference to leaching processes, the autoclave is useful in numerous other applications including catalytic chemistry reactions. The autoclave includes an agitator or agitation assembly for discharging molecular oxygen directly into the slurry. In this manner, the autoclave is able to realize relatively high rates of molecular oxygen transfer into the slurry and, therefore, high oxidation rates and low residence times. The autoclave is particularly effective in the pressure oxidation of slurried metal sulfide-containing materials. The metal sulfides that can be effectively utilized include without limitation gold sulfides, iron sulfides, copper sulfides, zinc sulfides, nickel sulfides, and arsenic sulfides.

Referring to FIGS. 1 and 2, the agitation assembly 10 is depicted. The agitation assembly 10 includes a rotatable shaft 14, a gas injecting impeller 18 and a mixing impeller 22 connected to the lower end of the shaft 14, and a motor (not shown) connected to the upper end of the shaft 14 for rotating the shaft 14 during pressure oxidation.

The rotatable shaft 14 includes a gas inlet 26 in communication with a conduit 30 extending longitudinally along the shaft 14. The conduit 30 is in communication with a number of conduits 34a–d in the gas injecting impeller 18 for dispersing the gas substantially uniformly throughout the slurry. A fresh oxygen-containing gas 37 from an oxygen supply plant or the ambient atmosphere can be introduced to the slurry via an inner conduit 25, the conduit 30, and finally radially outward through the conduits 34a–d. An oxygen-containing gas 38 is recycled from the autoclave atmosphere via inlet 26 (which is open to the autoclave interior) because rotation of the impeller 18 creates a negative pressure at the tips 78a–d of the blades which draws the gas through the inlet 26. The fresh oxygen-containing gas 37 mixes with the recycled oxygen-containing gas 38 downstream (or below) the outlet 39 of the inner conduit 25 and the mixed gas is outputted by the conduits 34a–d.

The relative orientations and dimensions of the inlet 26 and shaft conduit 30 are important. The longitudinal axis 42 of the conduit 30 is substantially normal (i.e., transverse) to the longitudinal axis 46 of the inlet 26. The conduit 30 and shaft 14 are coaxial and therefore have the same longitudinal axis 42. The relationship between the cross-sectional area of the inlet 26 normal to the direction of flow (i.e., normal to the inlet longitudinal axis 46) depends upon a number of factors including the desired oxygen transfer rate, the compartment size of the autoclave, the operating oxygen partial pressure, the slurry viscosity, and the like.

The bottom 62 of the conduit 30 is may be conically shaped in a convex orientation to effectuate redirection of the gas into the conduits 34a–d of the impeller 18. In this manner, eddies and other disturbances in the gas flow in response to the sudden change of direction are substantially minimized.

To facilitate dispersion of the gas in the slurry, the gas injecting impeller 18 has the outlet face 74a–d of each impeller blade 70a–d angled away from the direction of rotation of the gas injecting impeller 18 such that a shear zone exists at the tip 78a–d of each blade 70a–d to provide superior atomization and dispersion of the oxygen-containing gas (and therefore finer bubble formation). The outlet face 74a–d of each conduit 34a–d faces away from the direction of rotation while the longest side of the blade 70a–d faces in the direction of flow. The angle between the outlet face 74a–d and the tangent 82 of a circle defined by rotation of the tips 78a–d of the blades 70a–d is preferably about forty-five degrees.

The gas injecting (or gassing) impeller 18 is located at a depth in the autoclave slurry that maximizes effective gas transfer and dispersion. Locating the impeller below this optimum depth increases the hydraulic head that the impeller has to overcome to draw down the gas phase into the agitated slurry. This can significantly and unnecessarily increase the power required to maintain a given oxygen transfer rate.

The mixing (or nongassing) impeller 22 is located below the gas injecting impeller 18 at a suitable depth to maintain in suspension the solid particles in the autoclave in the slurry and to assist in distribution of the entrained gas bubbles in the slurry. Typically, the concentration of gas bubbles in the upper portion of the slurry (which contains the gas-injecting impeller 18) is greater than the gas bubble concentration in the lower portion of the slurry (which contains the mixing impeller 22).

Referring to FIG. 3, the operation of the agitation assembly will be described. During introduction of the sulfide-containing slurry 86 into the autoclave 90, the rotatable shaft 94 is rotated in a clockwise direction to induce turbulence in the slurry. Unlike the rotatable shaft 14 of FIGS. 1 and 2, the rotatable shaft 94 of FIG. 3 has a plurality of open inlets 98 that are open to the atmosphere in the autoclave 90 and an inner conduit extending the length of the shaft 94 to transport fresh oxygen gas from a source exterior to the autoclave. Rather, fresh oxygen 106 is introduced directly into the autoclave atmosphere via inlet 91 and drawn into the open inlets 98 and through a conduit (not shown) extending longitudinally along the shaft and finally through the blades and dispersed into the slurry. A vortex 102 forms where the shaft 94 is immersed in the slurry 86. An oxygen gas 106 is introduced into the autoclave and mixed with recirculated gas 110 drawn into the shaft via the inlets 98. The mixed gas 114 is dispersed radially outwardly, during rotation of the blades 70a–d, in the slurry 86. The mixing impeller 22, which rotates at the same rate and in the same direction as the gas injecting impeller 18, further assists in dispersing the gas bubbles 118 throughout the slurry 86, maintains in suspension the solid particles in the slurry, and provides a turnover of slurry from the bottom to the top of the vessel on a continuous basis.

The autoclave 90 is able to realize high oxygen transfer rates into the slurry 86. Typically, the oxygen transfer rate is at least about 2 kg moles and more typically at least about 4 kg moles and most typically ranges from about 2 kg moles to about 12 kg moles of molecular oxygen/cubic meter of slurry/hour. At such high transfer rates, the conversion of the metal sulfides into soluble metal salts or oxidized metal precipitates can be substantially completed (i.e., 90% or more) in residence times as short as about 60 minutes and more typically in as short as about 30 minutes.

Figure 4:
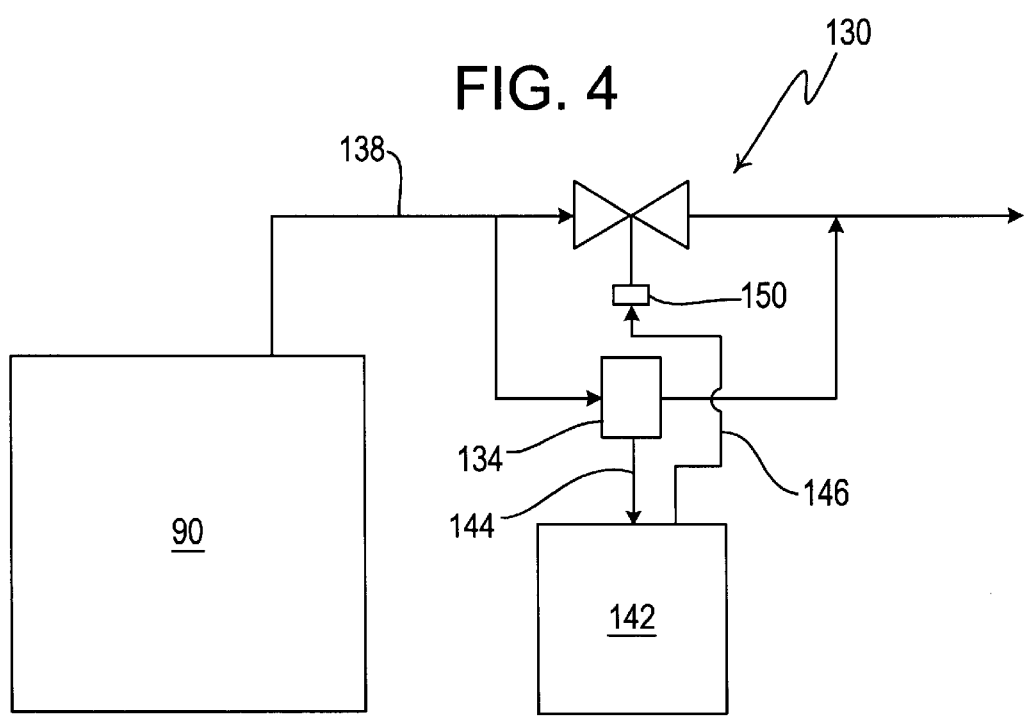
FIG. 4 is a flow schematic depicting the discharge control system.

FIG. 4 depicts a discharge control system for controllably removing the gas atmosphere from the autoclave 90 to prevent rupture of the autoclave 90 from high pressure gases. The system 130 includes a gas analyzer 134 for analyzing, either continuously or at suitable intervals of time, a selected component in the gas atmosphere in the autoclave 90, a vent 138 for venting the gas in the atmosphere, a controller 142 to monitor the signal 144 from the gas analyzer 134 and generate a control signal 146 in response thereto, and a control device 150 for controlling the amount of gas discharged into the exterior atmosphere in response to the control signal 146.

The selected component monitored by the gas analyzer 134 can be molecular oxygen, carbon dioxide, argon, and nitrogen, with molecular oxygen being most preferred.

When a threshold concentration, or partial pressure, of the selected component is reached, the controller 142 forwards a control signal to the control device 150 to open and release gas in the autoclave atmosphere. Preferably, the threshold is set such that the ratio of the partial pressure of oxygen to the partial pressure of nonoxygen compounds (e.g., carbon dioxide) ranges from about 1:4 to about 4:1 and more preferably from about 1:2 to about 2:1. Accordingly, when the partial pressure of oxygen drops below a certain level, i.e., when the ratio falls below the threshold, the control device 150 opens and the autoclave gas phase is vented to the atmosphere. Fresh "pure" oxygen is introduced at this time to maintain the autoclave operating pressure setpoint. The control device 150 closes either after the valve has been opened for a specified predetermined time or alternately, may be closed when the partial pressure of oxygen is restored to a specified setpoint.

Figure 5:
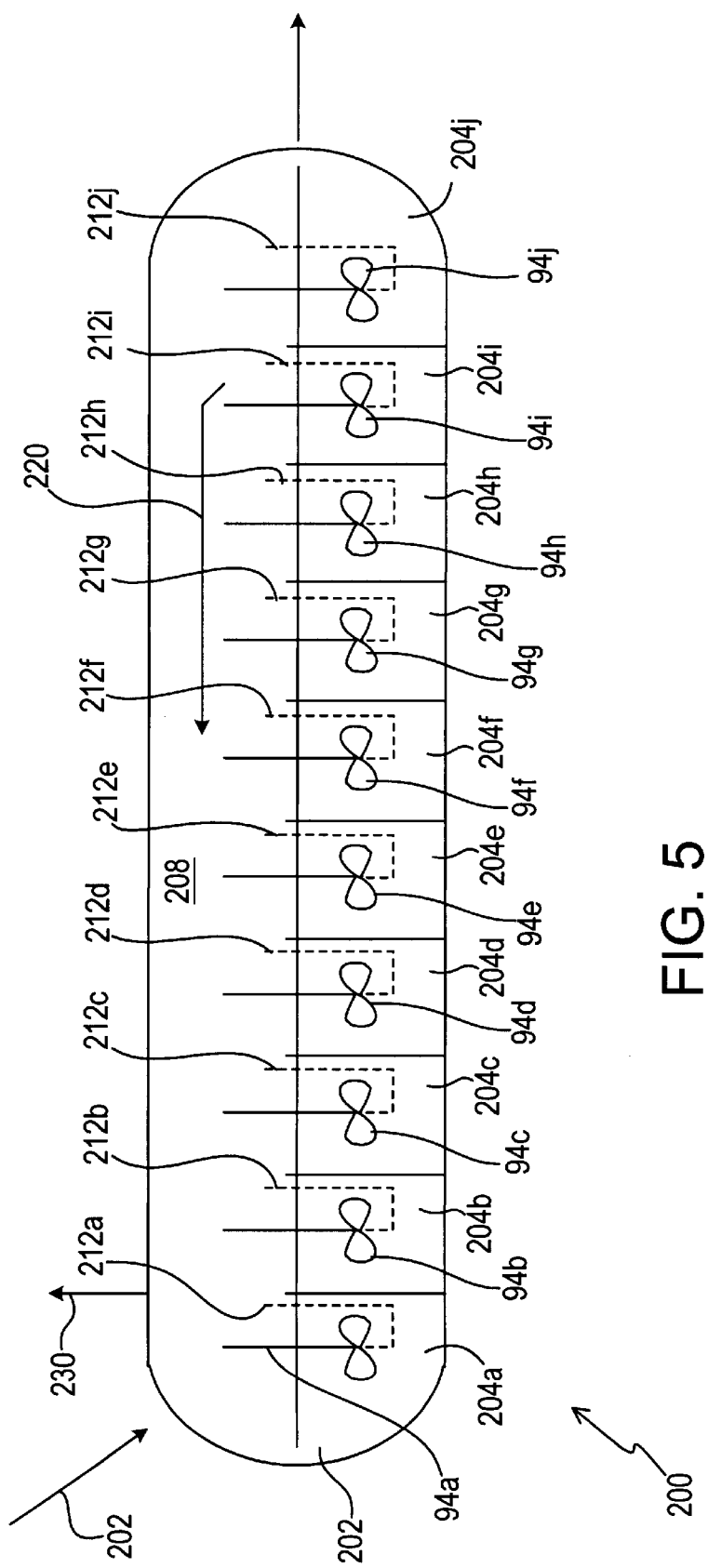
FIG. 5 is a cross-sectional view of an autoclave of the present invention showing the various compartments.

Referring to FIG. 5, an autoclave 200 utilizing a plurality of rotatable shafts 94a–j according to the present invention is depicted. In the initial compartments 204a and 204b, the operating temperature of the slurry is within the desired operating range because steam in the autoclave atmosphere 208 above the slurry 202 is drawn through the shaft and injected into the slurry at or near the impeller (i.e., mixing blades). As a result, additional steam is not introduced into the initial compartments. The autoclave further includes an optional sparge tube 212a–j in each compartment 204a–j for additional oxygen enrichment of the slurry 202. As will be appreciated, superheated steam 220 from the downstream compartments is drawn to the upstream compartments where it is introduced into the slurry 202.

A vent 230 is located at the input end of the autoclave to release inert gases, such as carbon dioxide, nitrogen and argon. As will be appreciated, the atmosphere of the autoclave typically contains about 80% steam, 8% molecular oxygen, and 12% inert gases. The carbon dioxide is evolved by the destruction of carbonate minerals in the autoclave feed by the acid present in the autoclave oxidized slurry. Nitrogen and argon can be present as impurities in the oxygen supply. The vent is preferably located to the input end of the autoclave because most of the carbon dioxide is evolved in the initial compartments. This location of the vent allows generally a higher carbon dioxide-to-oxygen ratio in the vent gas which substantially minimizes the overall oxygen consumption in the sulfur oxidation reaction.

In two of the trials, a sparge tube was used with the agitator to determine if the two oxygen introduction devices would synergistically provide even higher oxygen transfer rates compared to either device when used alone. The outlet for the sparge tube was located in close proximity to the interprop such that the bubblex of fresh molecular oxygen were dispersed along with the bubble of recycled gas, substantially uniformly throughout the slurry to provide qa high oxygen transfer rate. In a particularly preferred configuration the sparge tube outlet is located directly below the interprop so that the fresh molecular oxygen bubbles rose upwards through the slurry until dispersal by the interprop.

Data were measured in a solution containing about 0.5 M sodium sulfite ($Na_2 SO_3$) and 6 ppm cobalt ($Co^{2+}$) Oxygen ($O_2$) partial pressure was about 50 psi and the starting total pressure was about 386 psi at ambient temperature. The diameter of the agitator was about 980 mm and the pressure vessel 328 volume was around 5 cubic meters.

TABLE OF TEST RESULTS

| Top Impeller Depth mm | Type of Top Impeller | Type of Bottom Impeller | Oxygen Sparging | Agitator Power Draw (kW) | Oxygen Transfer Rate ($kg/m^3 \cdot h$) | Oxygen Transfer Energy Requirement ($kW \cdot h/t - O_2$) |
|---|---|---|---|---|---|---|
| 700 | RUSHTON ® | Interprop | NO | 14.4 | 39 | 87.6 |
| 700 | EKATO ® Gassing | Interporp | NO | 5.5 | 50 | 26.7 |
|  |  |  |  | 13.6 | 100 | 32.7 |
|  |  |  |  | 20.8 | 209 | 23.9 |
| 500 | EKATO ® Gassing | Interprop | NO | 5.3 | 72 | 17.8 |
|  |  |  |  | 13.7 | 92 | 35.9 |
|  |  |  |  | 21.1 | 145 | 34.8 |
| 500 | EKATO ® Gassing | Pitch Down Turbine | YES | 6.3 | 87 | 17.3 |
|  |  |  |  | 15.6 | 270 | 13.8 |
| 500 | EKATO ® Gassing | RUSHTON ® Turbine | YES | 6.4 | 114 | 13.5 |
|  |  |  |  | 16.5 | 273 | 14.5 |

EXPERIMENTAL

Figure 6:
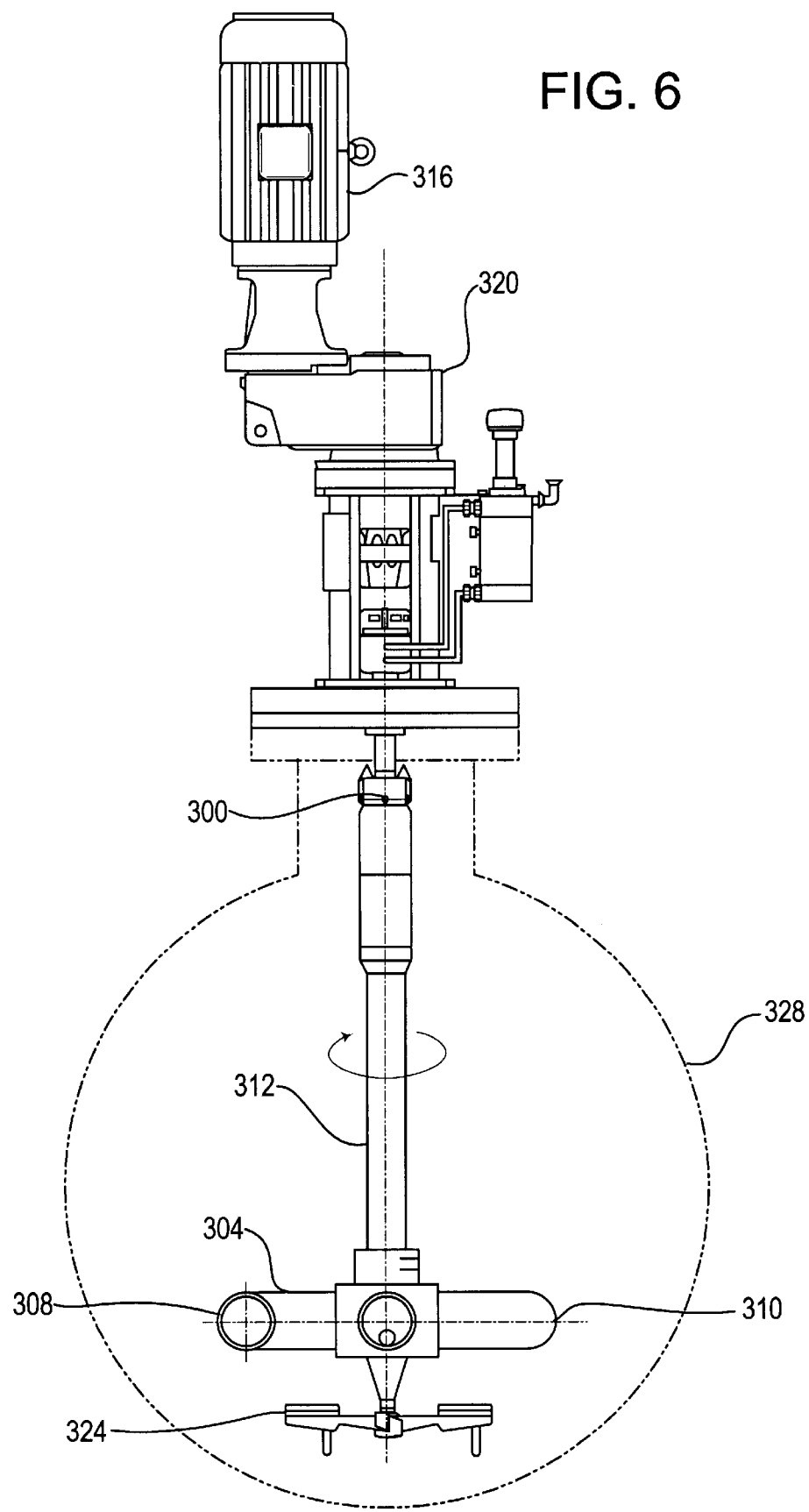
FIG. 6 is a cross-sectional view of an EKATO agitator used in the experiments.

An experiment was performed using a type HWL2060® standard agitator manufactured by EKATO® of the type shown in FIG. 6. The agitator included a plurality of open inlets 300 that were open to the atmosphere in the autoclave. The agitator did not have an inner conduit extending the length of the shaft to transport fresh oxygen gas from a source exterior to the autoclave into the slurry. The impeller blades 304 were made of round pipe. Alternatively, the blades could be made of square pipe, rectangular pipe, or any other shaped pipe. The blade tips 308 had an angle between the outlet face and the tangent of a circle defined by rotation of the tips of the blades 310 was about 45°, though the angle could range from about 30 to about 60°. The oxygen re-entrainment ports 300 of the agitator were located on the upper (hollow) shaft 312. The motor 316 and a gear unit 320 were located at the upper end of the agitator. An interprop 324 was located below the blades. Modifications can be made to allow fresh molecular oxygen such as a substantially pure molecular oxygen gas to be injected near or into the ports 300 instead of sparging oxygen into the slurry. A RUSHTON® interprop agitator was also used by way of comparison to the EKATO® agitator.

As can be seen from the table, the oxygen transfer rate was high in a number of the experiments, particularly when a sparge tube was used with the impeller. To realize the same benefits of sparging, the agitator design of FIG. 2 could also be employed.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for recovering a metal from a metal-containing material by autoclaving, the metal-containing material being contained in a slurry, comprising:
   (a) agitating the metal-containing slurry in a sealed vessel using at least one impeller engaging a rotatable shaft;
   (b) while agitating the slurry, passing a first oxygen-containing gas through the rotatable shaft and a second oxygen-containing gas through a sparge tube having an outlet located near the rotatable shaft and discharging the first and second oxygen-containing gases into the slurry; and
   (c) thereafter recovering the metal from the metal-containing slurry.

2. The method of claim 1, wherein step (b) comprises passing the gas through a blade of the impeller.

3. The method of claim 1, further comprising:
measuring a selected component of a gas atmosphere in the sealed vessel, the gas atmosphere being located above the metal-containing slurry and when the amount of the component exceeds or falls below a threshold amount, removing at least a portion of the gas atmosphere from the sealed vessel.

4. The method of claim 3, wherein the selected component is selected from the group consisting of molecular oxygen, carbon dioxide, argon, and nitrogen.

5. The method of claim 3, wherein the rate of removal of the gas atmosphere varies over time.

6. The method of claim 1, wherein the concentration of molecular oxygen in the second gas exceeds the concentration of molecular oxygen in the first gas.

7. The method of claim 6, wherein at least most of the molecular oxygen in the first gas is removed directly from the gas atmosphere of the sealed vessel and at least most of the molecular oxygen in the second gas is directly from a source located outside of the sealed vessel.

8. The method of claim 1, wherein a concentration of at least on of water vapor and carbon dioxide in the second gas is less than the concentration of the corresponding at least one of water vapor and carbon dioxide in the first gas.

9. The method of claim 8, wherein the second gas is substantially free of at least one of carbon dioxide and water vapor.

10. The method of claim 1, wherein the second gas is discrete from the first gas during the passing step (b).

11. A method for recovering a metal from a metal-containing material by pressure oxidation, the metal-containing material being contained in a slurry, comprising:
(a) agitating the slurry;
(b) while agitating the slurry, introducing first and second oxygen-containing gases having differing first and second oxygen concentrations, respectively, into the slurry, the first oxygen-containing gas being introduced into the slurry at a first location and the second oxygen-containing gas being introduced into the slurry at a second, different, location, whereby the metal in the metal-containing material is removed from the metal-containing material and at least one of dissolved in the slurry and precipitated from the slurry; and
(c) thereafter recovering the metal from the metal-containing slurry.

12. The method of claim 11, wherein the first gas is passed through a rotatable shaft of an impeller positioned in the slurry.

13. The method of claim 11, wherein the second gas is passed through a sparge tube positioned in the slurry and having an outlet located near the rotatable shaft.

14. The method of claim 12, wherein the first gas is passed through a blade of the impeller.

15. The method of claim 12, wherein the concentration of molecular oxygen in the second gas exceeds the concentration of molecular oxygen in the first gas.

16. The method of claim 11, wherein the vessel is sealed and at least most of the molecular oxygen in the first gas is removed directly from the gas atmosphere of the sealed vessel and at least most of the molecular oxygen in the second gas is directly from a source located outside of the sealed vessel.

17. The method of claim 12, wherein a concentration of at least one of water vapor and carbon dioxide in the second gas is less than the concentration of the corresponding at least one of water vapor and carbon dioxide in the first gas.

18. The method of claim 13, wherein the second gas is substantially free of at least one of carbon dioxide and water vapor.

19. The method of claim 11, wherein the second gas is discrete from the first gas during the introducing step (b).

20. A method for recovering a metal from a metal-containing material by pressure oxidation, the metal-containing material being entrained in a slurry, comprising:
(a) agitating the slurry with an impeller;
(b) while agitating the slurry, introducing first and second oxygen-containing gases having differing first and second oxygen concentrations, respectively, into the slurry, the first oxygen-containing gas being introduced into the slurry at a first location and the second oxygen-containing gas being introduced into the slurry at a second, different, location whereby the metal is removed from the metal-containing material; and
(c) thereafter recovering the removed metal from the metal-containing slurry.

21. The method of claim 20, wherein the first gas is passed through a rotatable shaft of the impeller.

22. The method of claim 20, wherein the second gas is passed through a sparge tube positioned in the slurry and having an outlet located near the impeller.

23. The method of claim 20, wherein the first gas is passed through a blade of the impeller.

24. The method of claim 22, wherein the concentration of molecular oxygen in the second gas exceeds the concentration of molecular oxygen in the first gas.

25. The method of claim 20, wherein the vessel is sealed and at least most of the molecular oxygen in the first gas is removed directly from the gas atmosphere of the sealed vessel and at least most of the molecular oxygen in the second gas is directly from a source located outside of the sealed vessel.

26. The method of claim 21, wherein a concentration of at least one of water vapor and carbon dioxide in the second gas is less than the concentration of the corresponding at least one of water vapor and carbon dioxide in the first gas.

27. The method of claim 22, wherein the second gas is substantially free of at least one of carbon dioxide and water vapor.

28. The method of claim 20, wherein the second gas is discrete from the first gas during the introducing step (b).

29. A method for recovering a metal from a metal-containing material by pressure oxidation, the metal-containing material being contained in a slurry, comprising:
(a) agitating the slurry;
(b) while agitating the slurry, introducing first and second gases having differing first and second concentrations, respectively, of at least one of water vapor and carbon dioxide into the slurry, the first gas being introduced into the slurry at a first location and the second gas being introduced into the slurry at a second, different, location, whereby the metal in the metal-containing material is removed from the metal-containing material and at least one of dissolved in the slurry and precipitated from the slurry; and
(c) thereafter recovering the metal from the metal-containing slurry.

30. The method of claim 29, wherein the first and second gases contain oxygen and the respective concentrations of oxygen in each of the first and second gases are different and wherein the first gas is passed through a rotatable shaft of an impeller positioned in the slurry.

31. The method of claim 29, wherein the second gas is passed through a sparge tube positioned in the slurry and having an outlet located near the rotatable shaft.

32. The method of claim 29, wherein the first gas is passed through a blade of the impeller.

33. The method of claim 30, wherein the concentration of molecular oxygen in the second gas exceeds the concentration of molecular oxygen in the first gas.

34. The method of claim 30, wherein the vessel is sealed and at least most of the molecular oxygen in the first gas is removed directly from the gas atmosphere of the sealed vessel and at least most of the molecular oxygen in the second gas is directly from a source located outside of the sealed vessel.

35. The method of claim 29, wherein the second gas is substantially free of at least one of carbon dioxide and water vapor.

36. The method of claim 29, the second gas is discrete from the first gas during the introducing step (b).

37. A method for recovering a metal from a metal-containing material by pressure oxidation, the metal-containing material being entrained in a slurry, comprising:

(a) agitating the slurry with an impeller;

(b) while agitating the slurry, introducing first and second oxygen-containing gases having differing concentrations, respectively, of at least one of water vapor and carbon dioxide into the slurry, the first oxygen-containing gas being introduced into the slurry at a first location and the second oxygen-containing gas being introduced into the slurry at a second, different, location whereby the metal is removed from the metal-containing material; and (c) thereafter recovering the removed metal from the metal-containing slurry.

38. The method of claim 37, wherein the first gas is passed through a rotatable shaft of the impeller.

39. The method of claim 37, wherein the second gas is passed through a sparge tube positioned in the slurry and having an outlet located near the impeller.

40. The method of claim 37, wherein the first gas is passed through a blade of the impeller.

41. The method of claim 37, wherein the concentration of molecular oxygen in the second gas exceeds the concentration of molecular oxygen in the first gas.

42. The method of claim 37, wherein the vessel is sealed and at least most of the molecular oxygen in the first gas is removed directly from the gas atmosphere of the sealed vessel and at least most of the molecular oxygen in the second gas is directly from a source located outside of the sealed vessel.

43. The method of claim 37, wherein the first and second oxygen-containing gases have differing molecular oxygen concentrations.

44. The method of claim 37, wherein the second gas is substantially free of at least one of carbon dioxide and water vapor.

45. The method of claim 37, wherein the second gas is discrete from the first gas during the introducing step (b).

* * * * *